Aug. 4, 1936.  E. H. WORTHINGTON  2,049,883
LAWN MOWER
Filed Dec. 9, 1933
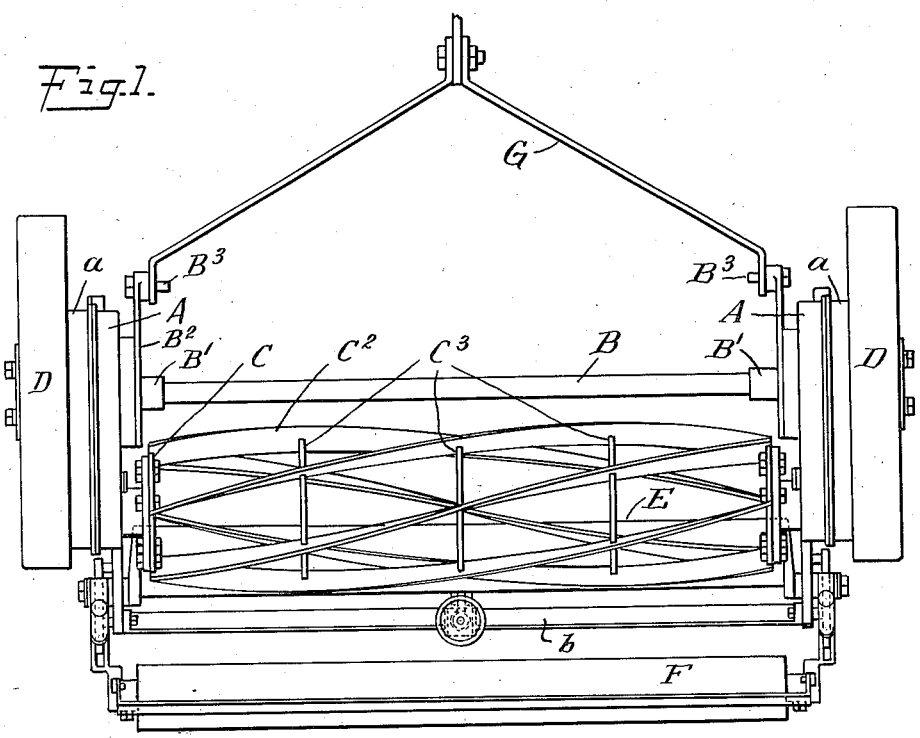
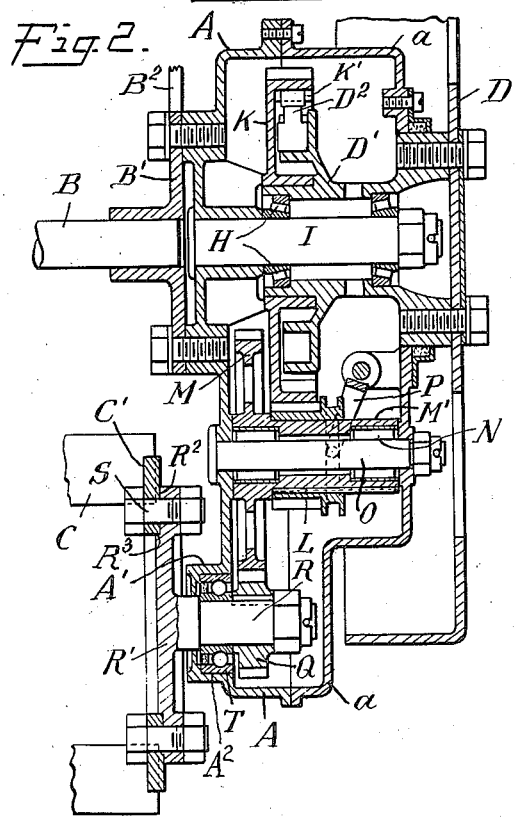
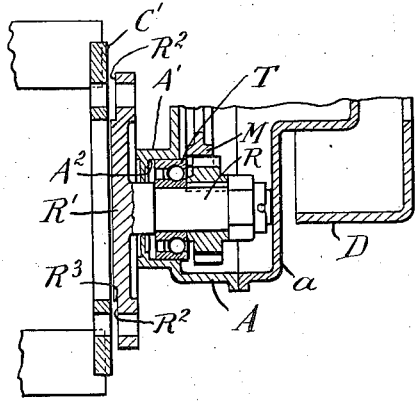
INVENTOR
Edward H. Worthington
BY
J. E. Hubbell
ATTORNEY Patented Aug. 4, 1936

2,049,883

UNITED STATES PATENT OFFICE 2,049,883

LAWN MOWER

Edward H. Worthington, Dunfield, N. J.

Application December 9, 1933, Serial No. 701,600

14 Claims. (Cl. 56—294)

The present invention relates to lawn mowers of well known type comprising a frame work in which is mounted a rotating fly knife and gearing through which the fly knife is rotated by driving means rolling along the ground and journalled in said frame work, and the general object of the invention is to improve such lawn mowers in respect to their fly knife portions. More specifically the object of the invention is to provide a fly knife and means for mounting it in a lawn mower of the type mentioned which will permit the removal of the fly knife from the lawn mower frame work and its proper replacement in a simple, easy and expeditious manner.

The invention is of especial utility in lawn mowers of the so-called high wheel form comprising two wheels, usually considerably larger in diameter than the fly knife, which are journalled in the frame work at opposite sides of the latter and turn about an axis in front of the fly knife and which as they roll along the ground rotate the fly knife through gearing mounted in the frame work. In such high wheel lawn mowers, as heretofore constructed, it has been impossible to remove the fly knife and remount it in the frame work except by dismantling and assembling operations so extensive and difficult to perform that in practice, the fly knife ordinarily has not been removed for grinding and repair operations which may be performed better and more easily when the fly wheel is separated from the frame work than when mounted in the latter. This fact has been so well recognized that it has led to the development of grinding machines for grinding the multiple knife blades of the fly wheel one at a time, with the fly knife mounted in the lawn mower, although it is well known that the blades may be ground more accurately and less expensively in a grinding machine in which the fly knife may be mounted so that all of the blades are ground simultaneously.

The various features of novelty which characterize my invention are pointed out with particularity in the claims annexed to and forming a part of this specification. For a better understanding of the invention, however, and its advantages and specific objects obtained with it, reference should be had to the accompanying drawing and descriptive matter in which I have illustrated and described a preferred embodiment of the invention.

Of the drawing:

Fig. 1 is a plan view of a lawn mower;

Fig. 2 is a partial section on a plane including the driving wheel and fly wheel axes of the lawn mower shown in Fig. 1; and Fig. 3 is a view taken similarly to Fig. 2 showing parts in relative positions different from those shown in Fig. 2.

In the drawing I have illustrated the use of the invention in a high wheel lawn mower which in most respects is like the lawn mowers now in general use. The frame work of the lawn mower comprises side frame members which serve as gear housings and each of which comprises a gear case member A and a gear case cover a bolted thereto. The side frame members are connected by a main tie member B in front of the fly knife C and are advantageously connected also by a second tie member b at the rear of the fly knife. The two driving wheels D are located at opposite sides of the frame work and are journalled in the corresponding side frame members. In accordance with customary practice they are coaxial with the tie bar B, which in the form shown is rigidly secured at its ends to end members B' including transverse flange portions $B^2$ detachably secured by bolts to the adjacent gear case A. The fly knife C cooperates with a bed knife E suitably supported in the framework, and at the rear end of the lawn mower, a ground roll F' has its ends journalled in the rear portions of the side frames. As shown the flange portions $B^2$ support pintles $B^3$ for the attachment of traction means such as the draft rigging part G shown which is of a form suitable for connecting the mower to a tractor employed to draw the mower, or a gang of such mowers, over the ground.

As shown each wheel D is of a known type comprising a radial web portion to the inner side of which is bolted a hub portion D'. The latter surrounds and is journalled by means of the usual roller bearings H on a sub-shaft I anchored in the adjacent gear case A and in line with the tie bar B. To the hub D' of each wheel are pivoted the usual pawls $D^2$ adapted to engage locking shoulders or teeth K' of the main gear K of the train of gears through which the rotation of each wheel D tends to rotate the fly knife. Each gear K is journalled on the corresponding sleeve member D' and is normally caused to rotate with the latter by the interaction of one or more pawls $D^2$ and shoulders K', which are provided to permit rotation of one wheel D relatively to the other when occasion requires. In normal operation, the main gear K is in mesh with an intermediate pinion L which as shown is splined on the elongated hub M' of an intermediate gear M. The latter is journalled by means of roller bearings N on a supporting shaft O anchored at its ends in the corresponding gear case A and cover a. As shown, each pinion L may be moved longitudinally of the supporting hub M' into and out of mesh with the corresponding gear K by a forked lever P journalled in the corresponding gear housing. Each gear M is in mesh with and drives a corresponding knife pinion Q.

For the purposes of the present invention in the preferred form illustrated in section in Figs. 2 and 3, the pinion Q there shown is keyed on and rigidly secured to a shaft R which is journalled in and is longitudinally movable with respect to the adjacent gear case A, and is provided exteriorly of the gear housing with a radial flange or hub portion R' detachably secured to the adjacent end member C' of the fly knife C. The end member C' is in the form of an annulus which in the preferred form of the present invention has its outer end face and inner curved edge accurately machined to normally engage an abutting radial bearing surface R² and cylindrical shoulder R³, respectively, accurately machined for the purpose on the corresponding hub portion R', the shoulder R³ forming a centering portion extending into the annular end member C'. In the normal assembled condition of the apparatus each end ring C' is rigidly secured to the corresponding hub portion R' by bolts S, and each shaft R forms a trunnion extension from the adjacent end member C' of the fly knife. When the latter are removed and the hub portion R' is moved toward the adjacent gear case A as shown in Fig. 3, there is no inter-engagement between the hub R' and the fly knife which may interfere with the removal of the latter from the lawn mower for grinding or repair purposes.

To facilitate the longitudinal movement of the shaft R and its hub R' between their different positions shown in Figs. 2 and 3, the gear case A, in the preferred construction illustrated, is provided with a hollow projection A' providing a seat A², elongated in the direction of the axis of the shaft R, for the outer frame member of the roller bearing T by means of which the shaft R is journalled in the gear case A. Preferably, as in the construction illustrated, the fly knife and fly knife mounting provisions illustrated in Figs. 2 and 3 are duplicated at the other end of the fly knife, though it will be apparent that if sufficient longitudinal movement of one fly knife pinion shaft R is provided, the other fly knife pinion shaft need not be moved longitudinally of the corresponding gear case member A to longitudinally separate the two fly knife pinion shafts sufficiently for the ready removal of the fly knife. The fly knife in the preferred form illustrated, comprises a multiplicity of helical blades C² which are welded to the end members C' and are also welded to annular intermediate members C³.

As those skilled in the art will readily understand, the provisions made for removably mounting the fly knife in the lawn mower frame are simple and effective. In removing the fly knife all that is required is the removal of the attachment bolts S, and the movement of one or both of the shafts R longitudinally inward of the corresponding gear housing to provide such displacement of the parts C¹ and R¹ at each end of the fly knife as is illustrated in Fig. 3. In practice each longitudinally adjustable shaft R may be so moved into the gear housing by the blows of a hand hammer, the handle of which extends into the fly knife between an adjacent pair of blades C², so that the head of the hammer may engage the hub portion R'. In replacing the fly knife, each pinion shaft R may be returned to its normal position by tightening up the bolts S. As shown the inner ring frame member of the roller bearing T for the shaft R is snugly received between the hub of the pinion Q and a radial shoulder formed for the purpose in the shaft R. As shown objectionable end play of the fly knife in operation is prevented by the engagement of the outer frame ring of each roller bearing with the inner side of the end wall of the corresponding hollow projection A'.

The machining operations required for the accurate fitting together of each hub portion R' and the corresponding fly knife end member C' are obviously simply and easily formed. The fact that the fly knife requires no shaft other than the detachable trunnion shaft extensions formed by the fly knife pinion shafts R permits of some reduction in the fly knife construction cost and weight. The weight reduction facilitates the handling of the fly knife in grinding and repair operations and in mounting it in and removing it from the lawn mower frame. The surfaces of the end members C' machined for engagement with the hub surfaces R² and R³ form convenient surfaces for accurately centering the fly knife in a grinding machine during the grinding operation.

Certain features of construction partially illustrated in Fig. 1 but not described in detail herein pertaining to bed knife adjustments, are fully disclosed and claimed in my application, Serial No. 703,170, filed December 20, 1933.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a lawn mower, a frame work including a side frame having a trunnion receiving space, a fly knife having an end member adjacent said side frame and a trunnion extension from said end member detachably connected to the latter and extending into said space and journalled in said side frame and longitudinally retractile into said side frame out of engagement with said fly knife.

2. In a lawn mower, a frame work including a side frame having a trunnion receiving space, a fly knife having an end member adjacent said side frame and a trunnion extension from said end member detachably connected to the latter and extending into said space and journalled in said side frame and longitudinally retractile into said side frame out of engagement with said fly knife, said end member and shaft having cooperating centering and aligning surfaces, said surfaces including portions distributed longitudinally and transversely of the axis of the fly knife.

3. In a lawn mower, a frame work including side frames each having a trunnion receiving space, and a fly knife having detachable trunnion extensions at its ends extending into the spaces in, and journalled in said side frames and retractile thereinto to facilitate the removal of the fly knife.

4. In a lawn mower, a frame work including a side frame member, a driving wheel journalled in said side frame, a fly knife driving gear train mounted in said side frame including a gear actuated by the corresponding driving wheel, an intermediate gear, and a fly knife spur gear in mesh with the latter and having a supporting shaft longitudinally retractile into the corresponding frame, and a fly knife comprising blades and an end member adjacent said side frame and means for detachably connecting said member to said shaft.

5. In a lawn mower, a frame work including side frame members, driving wheels at the opposite sides of said frame work and each journalled in the corresponding side frame, a fly knife driving gear train mounted in each side frame including a gear actuated by the corresponding driving wheel, an intermediate gear and a fly knife spur gear in mesh with the latter and having a supporting shaft longitudinally retractile into the corresponding frame, a fly knife comprising blades and end members, and means for detachably connecting each end member to the adjacent fly knife pinion shaft.

6. In a lawn mower, a fly knife comprising end members and blades connected to and extending between said end members and trunnion extensions each including a hub portion abutting against the outer side of and means directly engaging and abutting against the corresponding end member, and detachably securing each hub portion to the corresponding end member.

7. In a lawn mower, a fly knife comprising annular end members and blades connected to and extending between said end members and trunnion extensions detachably connected to said end members, and each comprising a centering portion extending into the corresponding annular end member and a portion extending outwardly from said centering portion and abutting against the outer side of said end member and means engaging each of said outwardly extending portion and detachably securing it to the corresponding end member.

8. In a lawn mower, a fly knife comprising annular end members and blades connected to and extending between said end members and trunnion extensions detachably connected to said end members, each comprising a hub having a portion extending into and engaging the inner edge of the corresponding annular end member and a radial portion abutting against the outer end surface of the latter and means directly engaging each said radial portion and each detachably securing it to the corresponding end member.

9. In a lawn mower, a fly knife, a framework including side frame members, driving wheels at the opposite sides of said framework and each journalled in the corresponding side frame member, a fly knife driving gear train mounted in each side frame and including a gear actuated by the corresponding driving wheel, a fly knife pinion and a supporting shaft for said pinion, each of said shafts having a fly knife engaging portion projecting from the inner side of the corresponding side frame member, one at least of said shafts being longitudinally retractile into the side frame member in which it is journalled to permit a relative approach of said portions into engagement with the corresponding ends of said fly knife and a relative separation of said portions to permit the removal of the fly knife, and means for detachably connecting said shaft portions to the respectively adjacent portions of the fly knife.

10. In a lawn mower, a fly knife, a framework including side frame members, driving wheels at the opposite sides of said framework and each journalled in the corresponding side frame member, a fly knife driving gear train mounted in each side frame and including a gear actuated by the corresponding driving wheel, a fly knife pinion and a supporting shaft for said pinion, each of said shafts having a fly knife engaging portion projecting from the inner side of the corresponding side frame member, and including a part adapted for axial abutment against the end of the fly knife and a centering part adapted to axially overlap a corresponding portion of the fly knife, one at least of said shafts being longitudinally retractile into the side frame member in which it is journalled to permit a relative approach of said portions into engagement with the corresponding ends of said fly knife and a relative separation of said portions to permit the removal of the fly knife, and means for detachably connecting said shaft portions to the respectively adjacent portions of the fly knife.

11. In a lawn mower, a fly knife, a framework including side frame members, driving wheels at the opposite sides of said framework and each journalled in the corresponding side frame, a fly knife driving gear train mounted in each side frame and including a gear actuated by the corresponding driving wheel, a fly knife pinion and a supporting shaft for the latter having a portion projecting from the inner side of the corresponding side frame member and normally in engagement with the corresponding end of the fly knife, each shaft and the adjacent end of the fly knife having abutting surfaces extending transversely to the shaft axis and having axially overlapping portions cooperating to align the fly knife and shafts, one at least of said shafts being longitudinally retractile into the corresponding side frame to permit retraction into the latter of the shaft for the removal of the fly knife, and means for detachably clamping the said abutting fly knife and shaft surfaces together.

12. In a lawn mower, a fly knife comprising blades and end members, a framework including side frame members, driving wheels at the opposite sides of said framework and each journalled in the corresponding side frame member, a fly knife driving gear train mounted in each side frame member and including a gear actuated by the corresponding driving wheel, a fly knife pinion and a supporting shaft for the latter, each such shaft projecting from the inner side of the corresponding side frame member and having a hub portion spaced away from the latter, one at least of said shafts being longitudinally retractile into the corresponding side frame member to permit relative to and fro movements of the two shafts between a relative position in which each hub portion engages the corresponding end member of the fly knife and a relative position in which the two hub portions are more widely separated to permit the lateral removal of the fly knife, and clamping bolts extending parallel to said shafts and normally connecting the hub member of each longitudinally retractile shaft to the corresponding end member of the fly knife.

13. In a lawn mower, a fly knife comprising blades and annular end members, a framework including side frame members, driving wheels at the opposite sides of said framework and each journalled in the corresponding side frame, a fly knife driving gear train mounted in each side frame and including a gear actuated by the corresponding driving wheel, a fly knife pinion and a supporting shaft for the latter, each such shaft projecting from the inner side of the corresponding side frame member and having a hub portion spaced away from the latter and including an outer portion adapted to abut against the side of the adjacent end member and a central centering portion adapted to engage the inner edge of said end member, one at least of said shafts being longitudinally retractile into the corresponding side frame member for a relative to and fro movement of the two shafts between a relative position in which each outer hub portion abuts against the side of the corresponding fly knife end member and the latter is entered by the corresponding hub centering portion, and a relative position in which the two hub portions are more widely separated to permit the lateral removal of the fly knife, and means detachably connecting said hub portions to the fly knife end portions.

14. In a lawn mower, a fly knife, a framework including side frame members, driving wheels at the opposite sides of said framework and each journalled in the corresponding side frame member, a fly knife driving gear train mounted in each side frame and including a gear actuated by the corresponding driving wheel, a fly knife pinion and a supporting shaft for said pinion, each of said shafts having a fly knife engaging portion projecting from the inner side of the corresponding side frame member, and the latter being formed with an internal guideway surrounding the shaft, a ball bearing for said shaft and including a frame held by the shaft against movement in the direction of its axis and mounted in said guideway for retractile movement thereinto away from the fly knife to disengage said shaft from the fly knife, and means for detachably connecting said shaft portions to the ends of said fly knife.

EDWARD H. WORTHINGTON.